United States Patent
Puigbo

[11] Patent Number: 6,116,370
[45] Date of Patent: Sep. 12, 2000

[54] ANTI-THEFT SYSTEM

[76] Inventor: Fernando Marina Puigbo, VLN-150, P.O. Box 025685, Miami, Fla. 33102-5685

[21] Appl. No.: 09/121,328

[22] Filed: Jul. 23, 1998

[51] Int. Cl.[7] .............................. B60R 25/00; B60R 25/06
[52] U.S. Cl. .............................. 180/287; 70/204; 70/246; 70/247; 74/543; 74/544; 74/545; 74/557; 180/336
[58] Field of Search ...................... 180/287, 336; 74/543, 544, 545, 557; 403/322.3, 109.7, 325; 70/159, 201, 202, 245, 247, 204, 246

[56] References Cited

U.S. PATENT DOCUMENTS

| | | | |
|---|---|---|---|
| 1,662,643 | 3/1928 | Hosford | 70/204 |
| 2,682,414 | 6/1954 | Richardson | 403/325 |
| 4,541,257 | 9/1985 | Stoll | 70/247 |
| 4,732,232 | 3/1988 | Miyagi et al. | 180/336 |
| 4,759,424 | 7/1988 | Rolleri | 180/287 |
| 4,993,248 | 2/1991 | Nordberg | 70/247 |
| 5,211,078 | 5/1993 | McCarthy et al. | 70/204 |
| 6,000,256 | 12/1999 | Pornaghdi | 70/247 |

FOREIGN PATENT DOCUMENTS

| | | | |
|---|---|---|---|
| 2491412 | 4/1982 | France | 180/287 |
| 9002895 | 3/1990 | WIPO | 180/336 |

*Primary Examiner*—Peter C. English
*Assistant Examiner*—Lynda Jasmin

[57] ABSTRACT

A new anti-theft system for permitting removal of the gear selection shaft from a vehicle having a gear selection console with an aperture extending through it that permits external gear selection of a transmission, thereby preventing theft of the vehicle. The inventive device includes a transmission engaging lever that is movably mounted to a transmission. The first end of the transmission engaging lever is insertable into the lower end of a shaft member that extends through the aperture in the console. A release lever extends from the aperture of the shaft member towards the lower end of the shaft member. The second end of the release lever has a flange extending from it that is inserted into a notch in the transmission engaging lever when the release lever is in an engaged position, thereby coupling the shaft member to the transmission engaging lever. The flange of the release lever is spaced apart from the notch of the transmission engaging lever when the release lever is in a released position, permitting removal of the shaft member from the console.

10 Claims, 3 Drawing Sheets

ANTI-THEFT SYSTEM

BACKGROUND OF THE INVENTION

1. Field of the Invention

The present invention relates to theft prevention systems and more particularly pertains to a new anti-theft system for permitting removal of the gear selection shaft from a vehicle having a gear selection console with an aperture extending through it that permits external gear selection of a transmission, thereby preventing theft of the vehicle.

2. Description of the Prior Art

The use of theft prevention systems is known in the prior art. More specifically, theft prevention systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art theft prevention systems include U. S. Pat. No. 5,211,078; U.S. Pat. No. 4,541,257; U.S. Pat. No. 5,331,307; U.S. Pat. No. 3,401,544; U.S. Pat. No. 3,246,535; EPO Patent No. EP 0 703 520 A1 (Inventor: Woeste); and PCT Patent No. WO 87/06897 (Inventor: Robinson).

While these devices fulfill their respective, particular objectives and requirements, the aforementioned patents do not disclose a new anti-theft system. The inventive device includes a transmission engaging lever that is movably mounted to a transmission. The first end of the transmission engaging lever is insertable into the lower end of a shaft member that extends through the aperture in the console. A release lever extends from the aperture of the shaft member towards the lower end of the shaft member. The second end of the release lever has a flange extending from it that is inserted into a notch in the transmission engaging lever when the release lever is in an engaged position, thereby coupling the shaft member to the transmission engaging lever. The flange of the release lever is spaced apart from the notch of the transmission engaging lever when the release lever is in a released position, permitting removal of the shaft member from the console.

In these respects, the anti-theft system according to the present invention substantially departs from the conventional concepts and designs of the prior art, and in so doing provides an apparatus primarily developed for the purpose of permitting removal of the gear selection shaft from a vehicle having a gear selection console with an aperture extending through it that permits external gear selection of a transmission, thereby preventing theft of the vehicle.

SUMMARY OF THE INVENTION

In view of the foregoing disadvantages inherent in the known types of theft prevention systems now present in the prior art, the present invention provides a new anti-theft system construction wherein the same can be utilized for permitting removal of the gear selection shaft from a vehicle having a gear selection console with an aperture extending through it that permits external gear selection of a transmission, thereby preventing theft of the vehicle.

The general purpose of the present invention, which will be described subsequently in greater detail, is to provide a new antitheft system apparatus and method which has many of the advantages of the theft prevention systems mentioned heretofore and many novel features that result in a new anti-theft system which is not anticipated, rendered obvious, suggested, or even implied by any of the prior art theft prevention systems, either alone or in any combination thereof.

To attain this, the present invention generally comprises a transmission engaging lever that is movably mounted to a transmission. The first end of the transmission engaging lever is insertable into the lower end of a shaft member that extends through the aperture in the console. A release lever extends from the aperture of the shaft member towards the lower end of the shaft member. The second end of the release lever has a flange extending from it that is inserted into a notch in the transmission engaging lever when the release lever is in an engaged position, thereby coupling the shaft member to the transmission engaging lever. The flange of the release lever is spaced apart from the notch of the transmission engaging lever when the release lever is in a released position, permitting removal of the shaft member from the console.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new anti-theft system apparatus and method which has many of the advantages of the theft prevention systems mentioned heretofore and many novel features that result in a new anti-theft system which is not anticipated, rendered obvious, suggested, or even implied by any of the prior art theft prevention systems, either alone or in any combination thereof.

It is another object of the present invention to provide a new anti-theft system which may be easily and efficiently manufactured and marketed.

It is a further object of the present invention to provide a new anti-theft system which is of a durable and reliable construction.

An even further object of the present invention is to provide a new anti-theft system which is susceptible of a low cost of manufacture with regard to both materials and labor, and which accordingly is then susceptible of low prices of sale to the consuming public, thereby making such anti-theft system economically available to the buying public.

Still yet another object of the present invention is to provide a new anti-theft system which provides in the apparatuses and methods of the prior art some of the advantages thereof, while simultaneously overcoming some of the disadvantages normally associated therewith.

Still another object of the present invention is to provide a new anti-theft system for permitting removal of the gear selection shaft from a vehicle having a gear selection console with an aperture extending through it that permits external gear selection of a transmission, thereby preventing theft of the vehicle.

Yet another object of the present invention is to provide a new anti-theft system which includes a transmission engaging lever that is movably mounted to a transmission. The first end of the transmission engaging lever is insertable into the lower end of a shaft member that extends through the aperture in the console. A release lever extends from the aperture of the shaft member towards the lower end of the shaft member. The second end of the release lever has a flange extending from it that is inserted into a notch in the transmission engaging lever when the release lever is in an engaged position, thereby coupling the shaft member to the transmission engaging lever. The flange of the release lever is spaced apart from the notch of the transmission engaging lever when the release lever is in a released position, permitting removal of the shaft member from the console.

Still yet another object of the present invention is to provide a new anti-theft system that is less expensive and easier to install than electronic anti-theft devices.

Even still another object of the present invention is to provide a new anti-theft system that prevents a vehicle's transmission from being shifted into gear, even if the engine is started.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
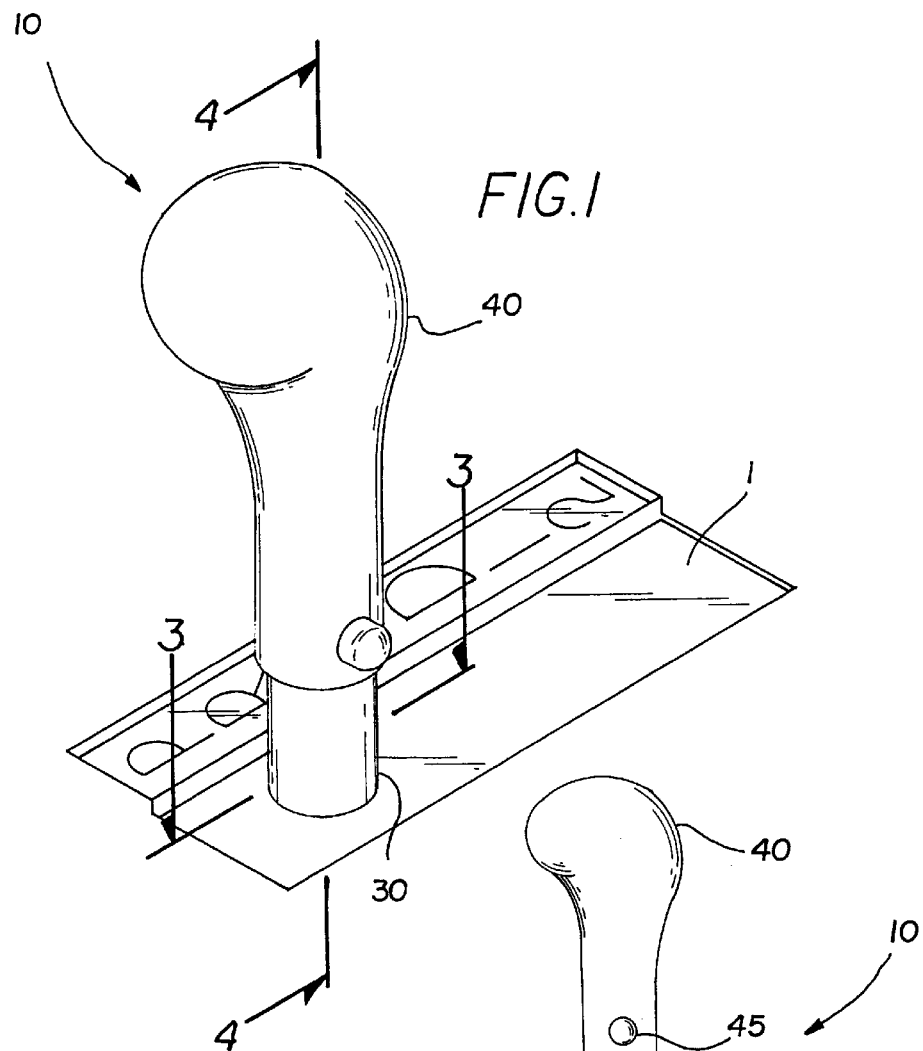
FIG. 1 is a schematic perspective view of a new anti-theft system according to the present invention.
Figure 2:
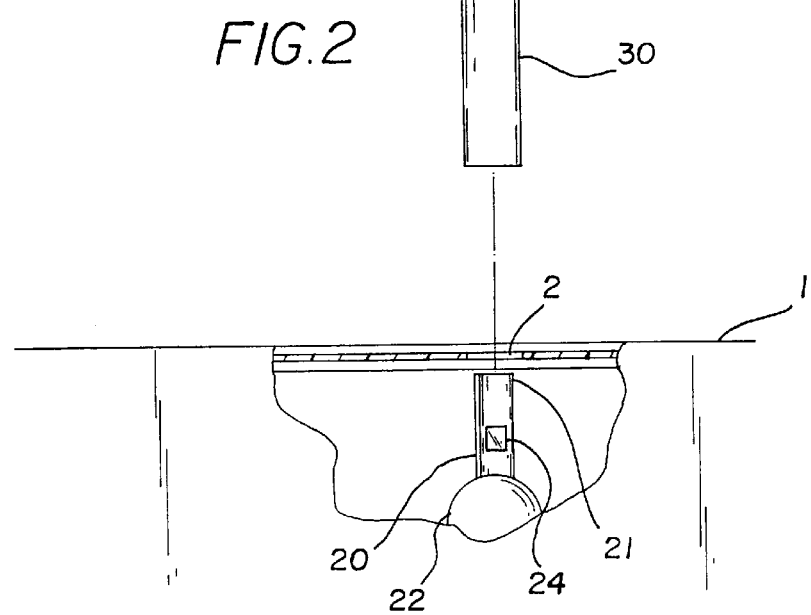
FIG. 2 is a schematic side view of the present invention.
Figure 3:
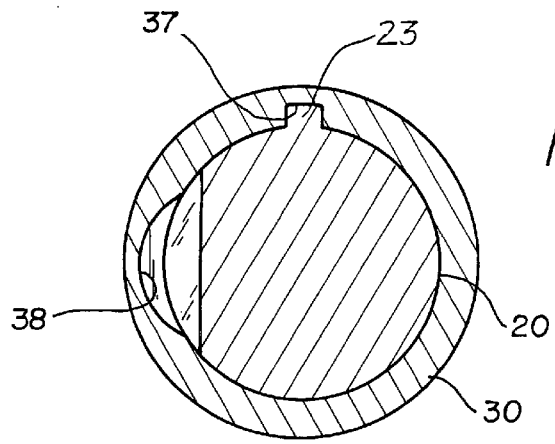
FIG. 3 is a schematic cross-sectional view of the present invention taken from Line 3—3 of FIG. 1.

With reference now to the drawings, and in particular to FIGS. 1 through 6 thereof, a new anti-theft system embodying the principles and concepts of the present invention and generally designated by the reference numeral 10 will be described.

As best illustrated in FIGS. 1 through 6, the anti-theft system 10 is designed for use with a vehicle having a gear selection console 1 with an aperture 2 extending through it that permits external gear selection of a transmission. The anti-theft system 10 may be used with either an automatic transmission or a manual transmission, whether the console is floor-mounted or on the steering column. The anti-theft system 10 generally comprises a transmission engaging lever 20 that is movably mounted to a transmission. The first end 21 of the transmission engaging lever 20 is insertable into the lower end 32 of a shaft member 30 that extends through the aperture 2 in the console 1. A release lever 50 extends from the aperture 34 of the shaft member 30 towards the lower end 32 of the shaft member 30. The second end 52 of the release lever 50 has a flange 53 extending from it that is inserted into a notch 24 in the transmission engaging lever 20 when the release lever 50 is in an engaged position, thereby coupling the shaft member 30 to the transmission engaging lever 20. The flange 53 of the release lever 50 is spaced apart from the notch 24 of the transmission engaging lever 20 when the release lever 50 is in a released position, permitting removal of the shaft member 30 from the console 1.

The transmission engaging lever 20 has first and second ends 21,22, and a notch 24 that is positioned towards the first end 21 of the transmission engaging lever 20. The second end 21 of the transmission engaging lever 20 is movably mounted to a transmission that is located beneath the console 1.

The shaft member 30 has an upper end 31, a lower end 32, an inner surface 33 that extends between the upper and lower end 32s and defines an interior space, and an aperture 34 that extends into the interior space. The aperture 34 is positioned towards the upper end 31 of the shaft member 30. Preferably, the first end 21 of the transmission engaging lever 20 is removably insertable in the lower end 32 of the shaft member 30.

The release lever 50 has first and second ends 51,52 and is disposed in the interior space of the shaft member 30. The release lever 50 extends from the aperture 34 of the shaft member 30 towards the lower end 32 of the shaft member 30. The first end 51 of the release lever 50 extends into the aperture 34 of the shaft member 30. The second end 52 of the release lever 50 has a flange 53 extending from it that is insertable into the notch 24 in the transmission engaging lever 20.

The release lever 50 is pivotable between an engaged position and a released position. The flange 53 of the release lever 50 extends into the notch 24 in the transmission engaging lever 20 when the release lever 50 is in the engaged position, thereby coupling the shaft member 30 to the transmission engaging lever 20. The flange 53 of the release lever 50 is spaced apart from the notch 24 in the transmission engaging lever 20 when the release lever 50 is in the released position, permitting removal of the shaft member 30 from the console 1 when the vehicle is not in use, thereby preventing the ability to shift the transmission into gear.

Figure 4:
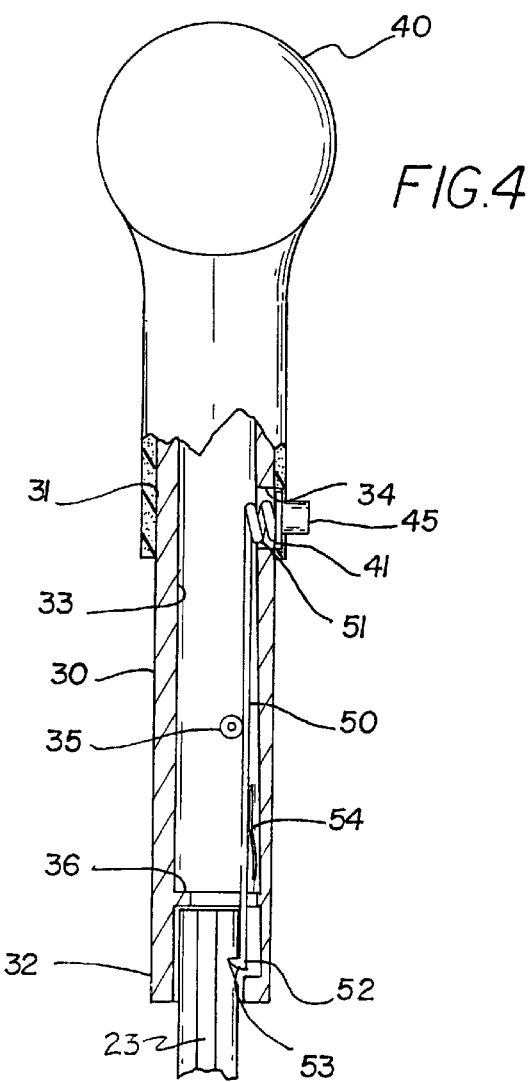
FIG. 4 is a schematic breakaway cross-sectional view of the present invention taken from Line 4—4 of FIG. 1.

Preferably, the release lever 50 is biased towards the engaged position. As shown in FIG. 4, a leaf spring 54 may be used to bias the release lever 50 towards the engaged position. Also preferably, a release button 45 extends into the aperture 34 of the shaft member 30. The first end 51 of the release lever 50 abuts the release button 45 such that pushing the release button 45 pivots the release lever 50 towards the released position. Even more preferably, the flange 53 of the release lever 50 is designed such that it will slide along the transmission engaging lever 20 and automatically lock in place without having to press the release button 45 when the shaft member 30 is slid over the transmission engaging lever 20.

Preferably, a handle member 40 is mounted on the upper end 31 of the shaft member 30. The handle member 40 has an interior and a hole 41 that extends into the interior of the handle member 40. The hole 41 of the handle member 40 is positioned adjacent the aperture 34 of the shaft member 30 to permit access to the first end 51 of the release lever 50.

Also preferably, the transmission engaging lever 20 has a guide flange 23 that extends from the second end 22 of the transmission engaging lever 20 towards said first end 21 of the transmission engaging lever 20. The inner surface 33 of said shaft member 30 has a corresponding guide groove 37 that extends between the upper and lower end 32s of the shaft member 30. The guide groove 37 receives the guide flange 23 of the transmission engaging lever 20 to ensure that the release lever 50 is positioned properly with respect to the notch 24 in the transmission engaging lever 20 as well as prevent rotation of the shaft member 30.

Preferably, as best illustrated in FIG. 4, a pin 35 is provided in the interior space of the shaft member 30. The release lever 50 is pivotable around the pin 35.

Even more preferably, the inner surface 33 of the shaft member 30 has a second groove 38 that extends from the aperture 34 of the shaft member 30 towards the lower end 32 of the shaft member 30. The release lever 50 is disposed between the second groove 38 of the shaft member 30 and the pin 35. The second groove 38 provides greater clearance within the interior space of the shaft member 30, permitting more room for the release lever 50 to pivot.

Preferably, a stop 36 is positioned in the interior space of the shaft member 30 towards the lower end 32 of the shaft member 30. The first end 21 of the transmission engaging lever 20 abuts the stop 36 in the interior space of the shaft member 30 to restrict the distance it slides into the interior space of the shaft member 30.

Figure 5:
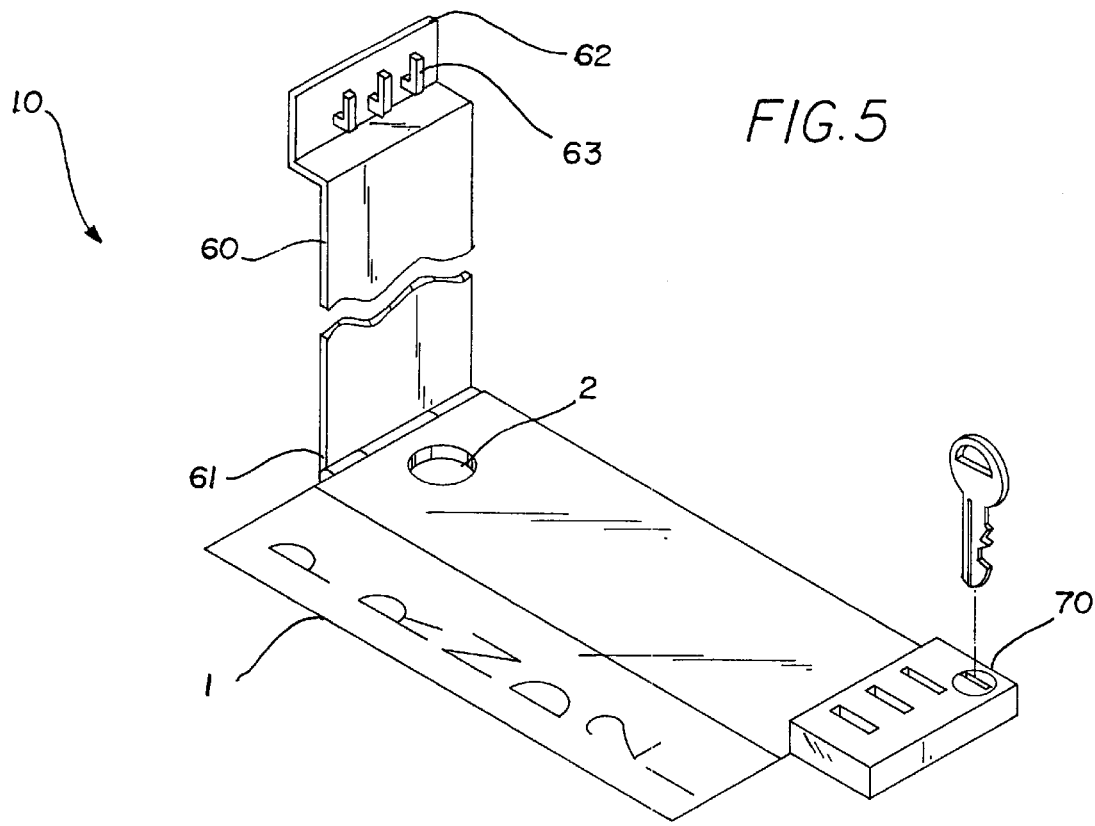
FIG. 5 is a schematic side view particularly illustrating a plate member and locking mechanism for covering the aperture in the gear selection console when the shaft member is removed.
Figure 6:
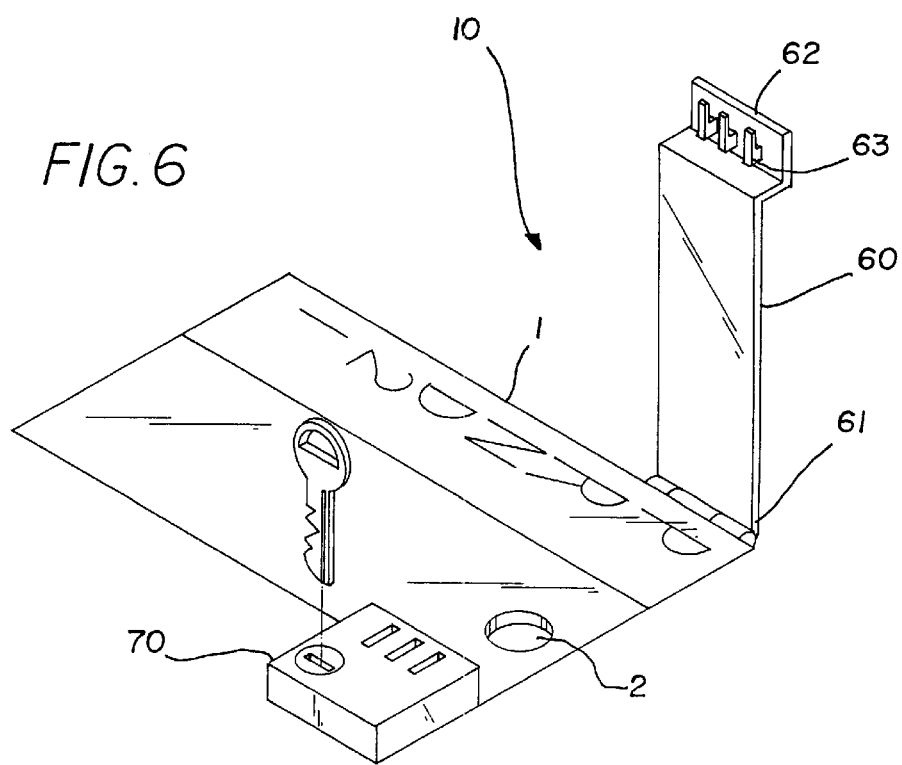
FIG. 6 is a schematic side view illustrating an alternate placement of a plate member and locking mechanism for covering the aperture in the gear selection console when the shaft member is removed.

Also preferably, as shown in FIGS. 5 and 6, a plate member 60 extends across the console 1 to cover the aperture 2 of the console 1 when the shaft member 30 is removed. The plate member 60 has a first end 61 and a second end 62. The first end 61 of the plate member 60 is pivotally coupled to the exterior of the console 1. The second end 62 of the plate member 60 has a fastening portion 63.

A locking mechanism 70 receives the fastening portion 63 of the plate member 60 and selectively secures the fastening portion 63 of the plate member 60 in place, thereby locking the plate member 60 in a position preventing access to the aperture 2 of the console 1.

In use, the release button 45 is pushed to place the release lever 50 in a released position. The shaft member 30 is removed from the aperture 2 of the console 1 and taken from the vehicle. The plate member 60 is positioned over the aperture 2 of the console 1 and locked in place with the locking mechanism 70. When use of the vehicle is again desired, the shaft member 30 is inserted into the aperture 2 of the console 1 and onto the transmission engaging lever 20 until the release lever 50 is in the engaged position and the flange 53 of the release lever 50 is inserted into the notch 24 in the transmission engaging lever 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An anti-theft system for a vehicle having a gear selection console with an aperture extending therethrough for permitting external gear selection of a transmission, said anti-theft system comprising:

a transmission engaging lever having first and second ends and a notch being positioned towards said first end of said transmission engaging lever, said second end of said transmission engaging lever being movably mounted to a transmission;

a shaft member having an upper end, a lower end, an inner surface being extended between said upper and lower ends and defining a interior space, and an aperture being extended into said interior space;

said first end of said transmission engaging lever being insertable in said lower end of said shaft member;

a release lever being extended from said aperture of said shaft member towards said lower end of said shaft member, said release lever having first and second ends, said second end of said release lever having a flange extending therefrom;

wherein said release lever is pivotable between an engaged position and a released position, said flange of said release lever being extended into said notch in said transmission engaging lever when said release lever is in said engaged position, said flange of said release lever being spaced apart from said notch in said transmission engaging lever when said release lever is in said released position; and said shaft member being coupled to said transmission engaging lever when said release lever is in said engaged position, said shaft member being removable from said console when said release lever is in said released position.

2. The anti-theft system of claim 1, further comprising a release button being extended into said aperture of said shaft member, said first end of said release lever abutting said release button.

3. The anti-theft system of claim 2, further comprising a handle member being mounted on said upper end of said shaft member and having an interior and a hole extending into said interior of said handle member, said hole of said handle member being positioned adjacent said aperture of said shaft member, wherein said release button is extended through said hole of said handle member into said aperture of said shaft member.

4. The anti-theft system of claim 1, wherein said transmission engaging lever has a guide flange being extended from said second end towards said first end, said inner surface of said shaft member having a guide groove being extended between said upper and lower ends of said shaft member, said guide groove being for receiving said guide flange of said transmission engaging lever.

5. The anti-theft system of claim 1, further comprising a pin being provided in said interior space of said shaft member, said release lever being pivotable around said pin.

6. The anti-theft system of claim 5, wherein said inner surface of said shaft member has a second groove being extended from said aperture in said shaft member towards said lower end of said shaft member, said release lever being disposed between said second groove of said shaft member and said pin.

7. The anti-theft system of claim 1, wherein said release lever is biased towards said engaged position.

8. The anti-theft system of claim 1, further comprising:
 a plate member for covering the aperture of the console when said handle member is removed, said plate member having a first end and a second end, said first end of said plate member being pivotally coupled to the exterior of the console, said second end of said plate member having a fastening portion; and
 a locking mechanism for receiving said fastening portion of said plate member, said locking mechanism being for selectively securing said fastening portion of said plate member in place, thereby locking said plate member in a position preventing access to the aperture of the console.

9. The anti-theft system of claim 1, further comprising a stop being positioned in said interior space of said shaft member towards said lower end of said shaft member, said first end of said transmission engaging lever abutting said stop in said interior space of said shaft member.

10. An anti-theft system for a vehicle having a gear selection console with an aperture extending therethrough for permitting external gear selection of a transmission, said anti-theft system comprising:
 a transmission engaging lever having first and second ends, a guide flange being extended from said second end towards said first end, and a notch being positioned towards said first end of said transmission engaging lever, said second end of said transmission engaging lever being movably mounted to a transmission;
 a shaft member having an upper end, a lower end, an inner surface being extended between said upper and lower ends and defining an interior space, and an aperture being extended into said interior space, said aperture being positioned towards said upper end of said shaft member;
 said first end of said transmission engaging lever being insertable in said lower end of said shaft member
 a pin being provided in said interior space of said shaft member;
 a stop being positioned in said interior space of said shaft member towards said lower end of said shaft member, said first end of said transmission engaging lever abutting said stop in said interior space of said shaft member;
 wherein said inner surface of said shaft member has a guide groove being extended between said upper and lower ends of said shaft member, said guide groove being for receiving said guide flange of said transmission engaging lever;
 wherein said inner surface of said shaft member has a second groove being extended from said aperture in said shaft member towards said lower end of said shaft member;
 a handle member being mounted on said upper end of said shaft member and having an interior and a hole extending into said interior of said handle member, said hole of said handle member being positioned adjacent said aperture of said shaft member;
 a release button being extended through said hole of said handle member into said aperture of said shaft member;
 a release lever being disposed between said second groove of said shaft member and said pin of said shaft member, said release lever being extended from said aperture of said shaft member towards said lower end of said shaft member, said release lever being pivotable around said pin;
 wherein said release lever has first and second ends, said first end of said release lever abutting said release button, said second end of said release lever having a flange extending therefrom;
 wherein said release lever is pivotable between an engaged position and a released position, said flange of said release lever being extended into said notch in said transmission engaging lever when said release lever is in said engaged position, said flange of said release lever being spaced apart from said notch in said transmission engaging lever when said release lever is in said released position, said release lever being biased towards said engaged position;
 said shaft member being coupled to said transmission engaging lever when said release lever is in said engaged position, said shaft member being removable from said console when said release lever is in said released position;
 a plate member for covering the aperture of the console when said handle member is removed, said plate member having a first end and a second end, said first end of said plate member being pivotally coupled to the exterior of the console, said second end of said plate member having a fastening portion; and
 a locking mechanism for receiving said fastening portion of said plate member, said locking mechanism being for selectively securing said fastening portion of said plate member in place, thereby locking said plate member in a position preventing access to the aperture of the console.

* * * * *